United States Patent
Graeve et al.

[11] Patent Number: 5,986,510
[45] Date of Patent: *Nov. 16, 1999

[54] METHOD AND APPARATUS FOR AMPLIFYING INPUT SIGNALS IN ONE OF MULTIPLE MODES OF RESOLUTION

[75] Inventors: Thorsten Graeve, Sunnyvale; Sheldon Hood, San Jose; Andrew G. Fabans, Los Gatos, all of Calif.

[73] Assignee: Reticon Corporation, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/005,225

[22] Filed: Jan. 9, 1998

[51] Int. Cl.$^6$ ............................... H03F 3/68; H03F 3/08
[52] U.S. Cl. ............................................. 330/295; 330/308
[58] Field of Search ............................... 330/124 R, 295, 330/59, 308, 51, 124 D, 84, 294, 107

[56] References Cited

U.S. PATENT DOCUMENTS

| | | | |
|---|---|---|---|
| 4,562,467 | 12/1985 | Bradley | 358/135 |
| 4,644,301 | 2/1987 | Hecht | 330/124 D |
| 4,775,799 | 10/1988 | Milch et al. | 250/578 |
| 5,144,447 | 9/1992 | Akimoto et al. | 358/213.11 |
| 5,198,816 | 3/1993 | Kalinowski et al. | 341/137 |
| 5,216,510 | 6/1993 | Amingual et al. | 358/213.15 |
| 5,262,871 | 11/1993 | Wilder et al. | 358/213.11 |
| 5,298,814 | 3/1994 | Caruso | 307/529 |
| 5,398,060 | 3/1995 | Leacock et al. | 348/241 |
| 5,574,275 | 11/1996 | Durst et al. | 250/208.2 |
| 5,717,458 | 2/1998 | Yonemoto | 348/305 |
| 5,734,596 | 3/1998 | Medelius et al. | 330/295 |

*Primary Examiner*—Robert Pascal
*Assistant Examiner*—Patricia Nguyen
*Attorney, Agent, or Firm*—Finnegan, Henderson, Farabow, Garrett & Dunner, L.L.P.

[57] ABSTRACT

Outputs from an array of input signals are amplified by an amplification section, sampled and multiplexed onto an analog bus. Amplifiers in the amplification section are segregated into groups. When the amplifiers are in a first mode, as indicated by a binning signal, the amplifiers within each group are electrically isolated from another and function independently from one another to provide a high resolution output signal. When in a second mode, amplifiers within a group operate as a single unified amplifier that averages the inputs for that group to provide a single output. Thus, in this second mode of operation, readout speed may be improved while increasing the signal-to-noise ratio of each input signal relative to the first mode of operation.

19 Claims, 3 Drawing Sheets

METHOD AND APPARATUS FOR AMPLIFYING INPUT SIGNALS IN ONE OF MULTIPLE MODES OF RESOLUTION

BACKGROUND OF THE INVENTION

I. Field of the Invention

The present invention relates to a method and related apparatus for reading out a plurality of amplified signals, such as the output signals from a photodiode array, in either a high or lower resolution mode.

II. Background Information

There are many instances in which a plurality of signals need to be amplified and read out sequentially. For example, output signals from an array of photodiodes can be individually amplified and thereafter made available to acquire a composite signal indicative of the operation of the individual photodiodes. Such composite signals may, for example, be used to acquire an image corresponding to light incident upon the photodiodes.

FIG. 1 is a block diagram illustrating conventional circuitry for sequentially reading signals generated by a photodiode array having four diodes. The circuit of FIG. 1 includes a photodiode array 102 comprising a plurality of photodiodes 104, 106, 108 and 110, a plurality of amplifiers 112, 114, 116, 118, a plurality of sample and hold circuits 120, 122, 124 and 126, an analog multiplexer 128, and an output bus 130. The output of each photodiode 104, 106, 108 and 110 is connected to the input of a corresponding amplifier 112, 114, 116 and 118. The output of each amplifier 112, 114, 116 and 118 is coupled to a respective input of sample and hold circuits 120, 122, 124 and 126. The output of each sample and hold circuit 120, 122, 124 and 126 is coupled to an input of analog multiplexer 128. Multiplexer 128 has as a control input select lines 140. The output of analog multiplexer 128 is coupled to output bus 130.

The combination of photodiode 104, amplifier 112 and sample and hold circuit 120 forms a first channel 132. The combination of photodiode 106, amplifier 114 and sample and hold circuit 122 forms a second channel 134. The combination of photodiode 108, amplifier 116 and sample and hold circuit 124 forms a third channel 136. The combination of photodiode 110, amplifier 118 and sample and hold circuit 126 forms a fourth channel 138.

In operation, each of photodiodes 104, 106, 108 and 110, as is known to those skilled in the art, generates an output current as a function of light incident thereon. This output current is integrated by the corresponding amplifiers 112, 114, 116 and 118 to supply a corresponding voltage which is held in respective sample hold circuits 120, 122, 124 and 126 until delivered to bus 130 through operation of analog multiplexer 128. Specifically, analog multiplexer 128 is controlled through select signals 140 that operate, as is well known to those skilled in the art, to selectively couple an output from one of sample and hold circuits 120, 122, 124 and 126 to output bus 130. For example, during a complete read out cycle, select lines 140 may be cycled through states (00), (01), (10), and (11). Each of the states is maintained for a given time period. These states result in the corresponding connection of sample and hold circuit 120, 122, 124 and 126 to output terminal 130. Thus, signals representing light incident on photodiodes 104, 106, 108 and 110 are sequentially placed on output bus 130 through respective channels 132, 134, 136 and 138. The signal-to-noise ratio for each channel is dependent upon the characteristics of the individual operation of amplifiers 112, 114, 116 and 118.

Given the above method, four time periods are required to read an entire cycle of output signals from photodiode array 102. One conventional technique for improving readout speed is to sacrifice image resolution by simply skipping the outputs from one or more of channels 132, 134, 136 and 138. For example, by limiting select lines 140 to the states (00) and (10) for a given readout period, the readout speed may be doubled. However, with this method, the signal-to-noise ratio for each selected channel is the same as the signal-to-noise ratio for each channel with all channels accessed, and the information contained in the skipped channels is lost.

SUMMARY OF THE INVENTION

It is an object of the present invention to improve signal quality while increasing the readout speed of a multichannel system such as a photodiode array.

To achieve the foregoing object and in accordance with the purpose of the invention as embodied and broadly described herein, a method for amplifying a plurality of input signals in at least either a first high resolution mode and a second lower resolution mode is provided using a corresponding number of amplifiers that are segregated into groups. The method comprises the steps of applying each input signal to a corresponding one of the amplifiers, operating the amplifiers independent of one another when in the first mode, and operating each group of amplifiers as a single amplifier when in a second mode; whereby the signal-to-noise ratio of each group of amplifiers in the second mode of operation is improved over the signal-to-noise ratio of each of the amplifiers when in the first mode of operation.

The present invention further comprises a circuit responsive to a control signal, the circuit comprising a plurality of amplifiers each coupled to a corresponding one of a plurality of input signals with the plurality of amplifiers operating independently of one another when in a first mode of operation, and a plurality of shorting circuits each coupling together select ones of the plurality of amplifiers to form a plurality of independent operating amplifier groups, and, in response to a control signal, causing each amplifier group to operate in a second mode of operation as a single amplifier; whereby the signal-to-noise ratio of each amplifier group in the second mode of operation is improved over the signal-to-noise ratio of an individual amplifier when in the first mode of operation.

Said differently, the invention comprises a plurality of amplifying circuits for receiving corresponding signals and storing charge corresponding to the received signals, each amplifier circuit operating independently of one another when in a first mode, and shorting circuits for coupling together select ones of the plurality of amplifier circuits to form a plurality of amplifier groups, with each amplifier group operating as a single amplifier when in a second mode.

It is to be understood that both the foregoing general description and the following detail description are exemplary and explanatory only, and are not restrictive of the invention as claimed.

DETAILED DESCRIPTION OF THE PREFERRED EMBODIMENTS

Figure 1:
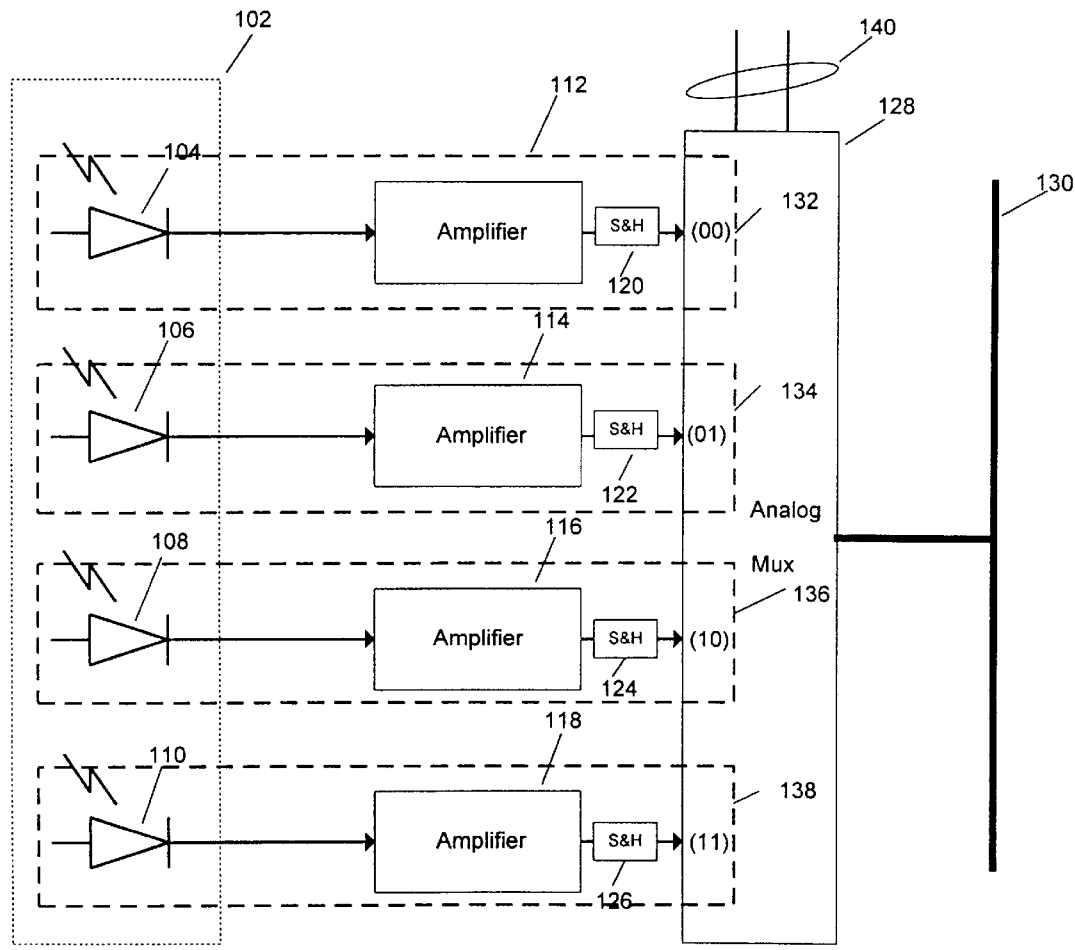
FIG. 1 is a block diagram illustrating conventional circuitry for reading signals generated by a four-diode photodiode array.

Reference will now be made in detail to the present preferred embodiment of the invention as illustrated in the accompanying drawings.

Simply stated, the subject invention comprises a process and related circuitry for independently amplifying a plurality of input signals using independent amplifiers in a first mode and for coupling together select ones of the independent amplifiers to form a plurality of amplifier groups to cause each of the groups to operate as a single amplifier in a second mode of operation. For example, there is once again illustrated in FIG. 2 photodiode array 102 comprising photodiodes 104, 106, 108 and 110, amplifiers 112, 114, 116 and 118, sample and hold circuits 120, 122, 124 and 126, analog multiplexer 128, and output bus 130. However, in addition, there is also disclosed in FIG. 2 a plurality of shorting circuits 204 and 206, with shorting circuit 204 coupled between amplifiers 112 and 114, and shorting circuit 206 coupled between amplifiers 116 and 118. As will be described in more detail below, shorting circuits 204 and 206 operate in response to a binning input signal 208 received from an external source to interconnect certain nodes internal to amplifiers 112 and 114, and internal to amplifiers 116 and 118, respectively, to thereby interconnect amplifiers 112 and 114 into a single integrated amplifier unit and to interconnect amplifiers 116 and 118 into a single integrated amplifier unit. By this interconnection, the outputs of amplifiers 112 and 114, instead of independently representing the inputs from photodiodes 104 and 106, represent an average of the input from photodiodes 104 and 106. Accordingly, the outputs at sample and hold circuits 120 and 122 are identical. In a similar manner, when shorting circuit 206 is activated in response to binning signal 208, amplifiers 116 and 118 are interconnected to operate as a single amplifier unit providing as identical outputs to sample and hold units 124 and 126, a signal representing an average of the signals provided by photodiodes 108 and 110.

By allowing amplifiers 112 and 114 and corresponding amplifiers 116 and 118 to operate as a single amplifier in a second mode of operation, the signal-to-noise ratio of each resultant group of amplifiers is improved over the signal-to-noise ratio provided individually by amplifiers 112 and 114 and individually by amplifiers 116 and 118. In other words, where there had previously been four channels in a first mode of operation, there are in effect two channels in a second mode of operation with the signal-to-noise ratio of each of those two combined channels having been improved over the signal-to-noise ratio of each of the individual four channels. Thus, while speed is increased and resolution is sacrificed to a certain extent, the signal-to-noise ratio of the resultant output is improved over conventional readout methods and apparatus thereby effectively improving image contrast.

When operating in the first mode, in the absence of binning signal 208, select lines 140 may cycle through states (00), (01), (10), and (11) thereby causing the output from channels 132, 134, 136 and 138 to be sequentially supplied to analog bus 130. However, during the second mode of operation, with the presence of binning signal 208, shorting circuit 204 operates to unite channels 132 and 134 into a first combined channel of operation and shorting circuit 206 operates to unite channels 136 and 138 into a second combined channel. In this second mode of operation, select lines 140 may cycle through states (00) and (10), thereby driving analog multiplexer 128 to supply only the output from channels 132 and 136 in sequence which, as noted above, in the second mode represent the analog averaging of photodiodes 104 and 106 and the analog averaging of photodiodes 108 and 110 through the integrated operation of amplifiers 112 and 114 and the integrated operation of amplifiers 116 and 118, respectively. In this second mode of operation, the signal-to-noise ratio of the group of amplifiers 112 and 114 and the group of amplifiers 116 and 118 is improved over the signal-to-noise ratio of each of amplifiers 112, 114, 116 and 118 when operating independently in the first mode of operation.

Although the second mode of operation produces fewer distinct output signals than the first mode, thus lowering output resolution, the time required to complete a readout cycle can be improved because fewer output signals need to be selected by multiplexer 128. Moreover, in contrast to conventional methods for improving readout speed, the signal-to-noise ratio in the second, lower resolution mode is improved over the signal-to-noise ratio in the first, higher resolution mode.

Figure 2:
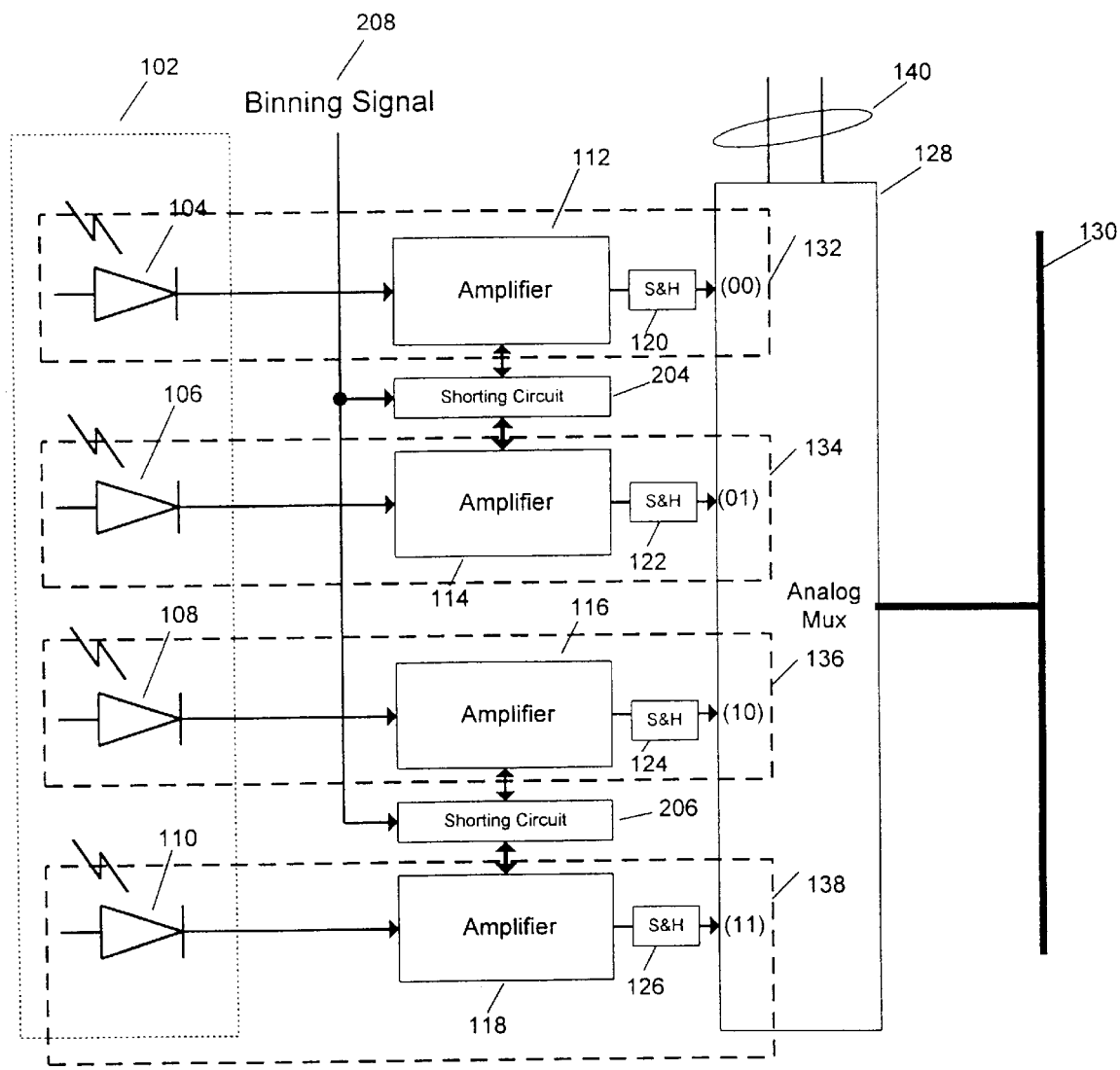
FIG. 2 is an exemplary block diagram illustrating circuitry incorporating the teachings of the present invention as applied to a four-diode photodiode array.
Figure 3:
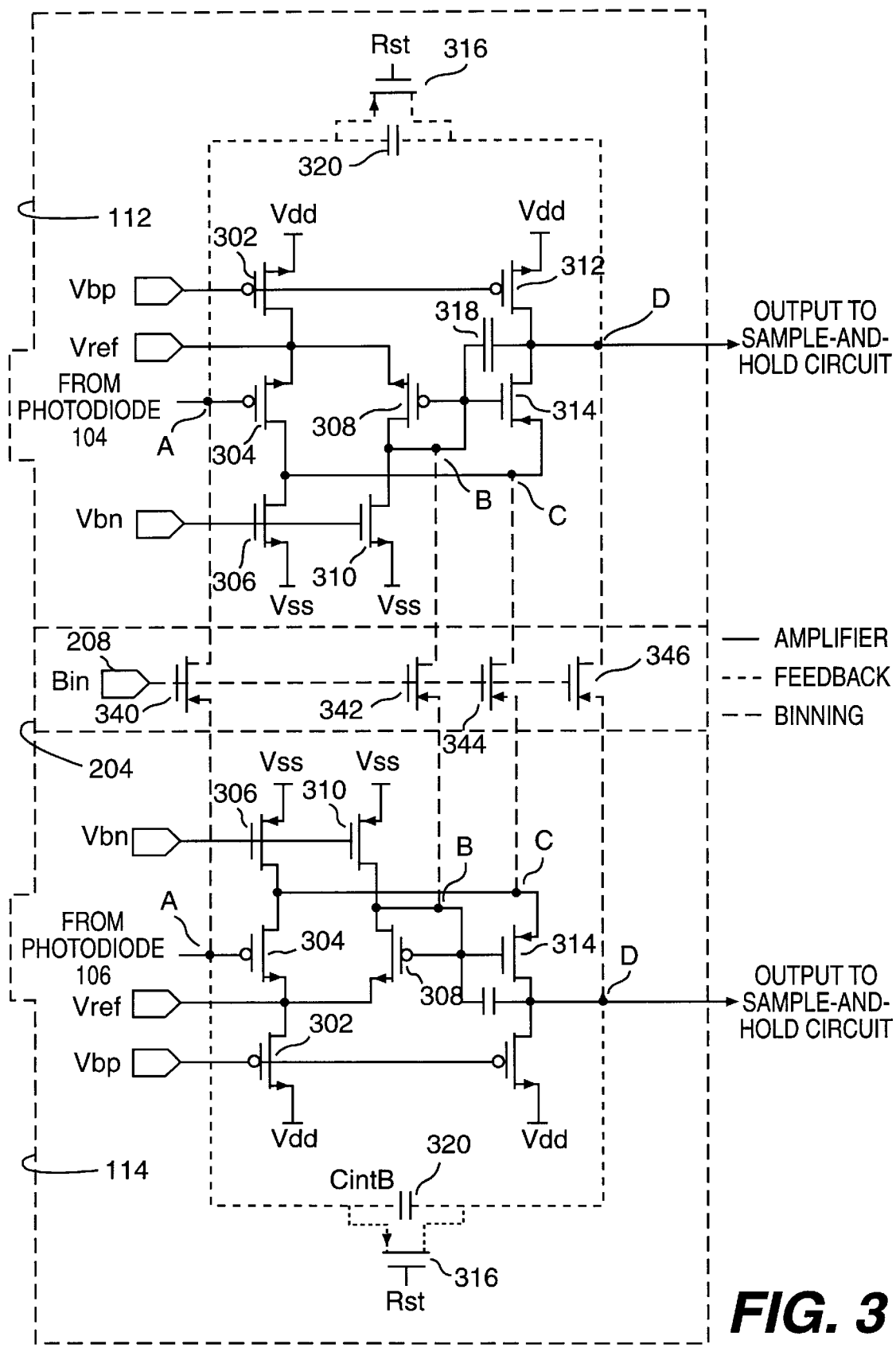
FIG. 3 is a more detailed circuit diagram of a portion of the block diagram shown in FIG. 2.

FIG. 3 is a more detailed circuit diagram of amplifiers 112 and 114 and of shorting circuit 204 illustrated in FIG. 2. As should be appreciated, shorting circuit 206 may be identical to shorting circuit 204 and, accordingly, no additional description or disclosure of shorting circuit 206 is being provided. In addition, all of amplifiers 112, 114, 116 and 118 may be identical. Accordingly, a detailed description will be provided herein only of amplifier 112.

Turning now to FIG. 3, amplifier 112 is shown to comprise transistors 302, 304, 306, 308, 310, 312, 314 and 316, and capacitors 318 and 320. Transistors 302, 304 and 306 are connected in series between voltage supplies Vdd and Vss. Transistors 308 and 310 are coupled in series between a common node of transistors 302 and 304 and power supply Vss. Transistors 312 and 314 are coupled in series between power supply Vdd and a common node of transistors 304 and 306, which is referred to below as node C. The gates of transistors 302 and 312 are supplied with a voltage Vbp, a common node between transistors 302 and 304 is supplied with a voltage Vref and the gates of transistors 306 and 310 are supplied with a voltage Vbn.

The gate of transistor 308 is coupled together to the gate of transistor 314 and to the drain of transistor 308. This common connector is referred to below as node B. The gate and drain of transistor 314 are coupled together by capacitor 318.

The output from photodiode 104 is supplied to the gate of transistor 304, which is referred to below as node A. Capacitor 320 is connected between the gate of transistor 304 and a common node D of transistors 312 and 314, which functions as the output of amplifier 112. Transistor 316 is coupled across capacitor 320 and is provided with a control signal Rst.

In operation, amplifier 112 is a CMOS charge integrating amplifier. Transistors 302, 306, 310 and 312 provide bias current, whereas transistors 304, 308 and 314 operate as an amplification section.

Shorting circuit 204 is disclosed in FIG. 3 as comprising transistors 340, 342, 344, and 346. Transistor 340 is coupled between the gates of transistors 304 in amplifiers 112 and 114, which is referred to as node A; transistor 342 is connected between the common node of transistors 308 and 310 in amplifiers 112 and 114, which is referred to as node B; transistor 344 is connected between the common connection of transistors 304 and 306 in amplifiers 112 and 114, which is referred to as node C; and transistor 346 is connected between the outputs of amplifiers 112 and 114; which is referred to as node D. The gates of all transistors 340, 342, 344, and 346 are coupled to receive binning signal 208.

In operation, in the absence of binning signal 208, transistors 340, 342, 344 and 346 are turned off, thereby isolating nodes A, B, C and D of amplifier 112 from corresponding nodes A, B, C and D of amplifier 114. However, upon receipt of a suitable binning signal 208 sufficient to turn on transistors 340, 342, 344 and 346, nodes A of amplifiers 112 and 114 are shorted, as well as are nodes B, C and D of amplifier 112 with corresponding nodes B, C and D of amplifier 114. In effect, through the operation of shorting circuit 204, amplifier 112 and amplifier 114 are reconfigured to form a single new integrated amplifier having a common input (node A) and a common output (node D) and having the effective active components internal to amplifiers 112 and 114 connected in parallel to one another, thereby improving the signal-to-noise ratio of the combined amplifiers 112 and 114 over the signal-to-noise ratio of amplifier 112 or amplifier 114 operating independently. Thus, the gates, sources and drains of transistors 304, 308 and 314 in amplifier 112 are all connected to the respective gates, sources and drains of corresponding transistors 304, 308 and 314 in amplifier 114. In other words, shorting circuit 204 does not simply connect the output of amplifiers 112 and 114 together, but rather integrally interconnects amplifiers 112 and 114 to form a new integrated amplifier with improved signal-to-voice ratio.

The improvement in signal-to-noise ratio in the integrated amplifier arises principally from the performance characteristics of the combined amplification section. The major noise sources in the amplifier are the intrinsic $1/g_m$ and $1/f$ noise of the transistors. By combining the gate areas of the transistors 304, 308, 314, for example, a noise reduction, and therefore an improvement in signal-to-noise ratio, can be achieved. Specifically, an increase in the combined gate width W with respect to gate length L leads to an increase in the transconductance $g_m$ of the transistor, resulting in a decrease in $1/g_m$ noise. Similarly, an increase in the combined gate width W, while keeping gate length L constant, results in a decrease of $1/f$ noise.

As should be appreciated by those skilled in the art, the outputs provided by amplifiers 112 and 114 when operating independently appear as a voltage resulting from a charge being stored on capacitor 320 of each amplifier. In the integrated configuration, through the operation of shorting circuit 204, the charge on capacitors 320 for each of amplifiers 112 and 114 is averaged to thereby supply a common output at common nodes D. To reset this charge, transistors 316 are turned on through the operation of reset signal Rst.

In the first mode of operation, the collected charge on each capacitor 320 is sampled every read out period by the corresponding sample and hold circuit 120, 122, 124 and 126. After each sampling period, the collected charge is cleared from charge integrating capacitors 320 by activating reset transistors 316. With the charge cleared from capacitors 320, reset transistors 316 are again made non-active (i.e. non-conductive) thus allowing charge integrating capacitors 320 in each of amplifiers 112, 114, 116 and 118 to once again accumulate charge from their corresponding diodes 104, 106, 108 and 110. In the second mode of operation, accumulated charge may be read out by operation of two of the four sample and hold circuits.

While there has been illustrated and described a presently preferred embodiment of the invention, it should be understood by those skilled in the art that various changes and modifications may be made, and equivalents may be substituted for elements thereof without departing from the true scope of the invention. For example, although photodiode array 102 has been described as having four photodiodes, of course, this is exemplary only and in practice more photodiodes would be employed. In addition, photodiode array 102 is not limited to a single dimensioned array and may comprise a two-dimensional array of photodiodes. In addition, the concept of the present invention is not limited to the utilization of input signals supplied by photodiodes, but may be employed in various embodiments in which a plurality of input signals are to be either amplified individually or amplified in collected groups with the desire to improve signal-to-noise ratio of the resultant collective group amplifications in accordance with the teachings of the present invention. Furthermore, amplifier groups, although shown as including only two amplifiers per group, may include multiple amplifiers per group and more than two amplifier groups may be used. Similarly, the low resolution output mode may skip more than a single amplifier per readout, and may itself include more than a single amplifier per channel. Also, there may be more than two modes of operation.

The invention described above was designed for use in integrated circuits for readout of amorphous silicon photodiode arrays. However, the binning feature of the present invention could be useful to detect charge generated in many types of linear and area sensors such as visible and infrared photodiode arrays, other types of large-area x-ray imagers, and high-energy radiation and particle detectors.

Although the invention was implemented using one particular amplifier topology (the CMOS single-ended transconductance amplifier), the scope should cover all amplifier designs, transistor technologies and substrate materials that can be used in a similar configuration.

Thus, additional modifications will readily occur to those skilled in the art without departing from the central scope of the invention. Therefore, this invention is not limited to the specific details, representative methods and illustrative examples shown and described. Accordingly, departures may be made from such teachings without departing from the scope of the appended claims.

What is claimed:

1. A method of amplifying a plurality of input signals in at least either a first and second resolution mode using a corresponding number of amplifiers that are segregated into groups, the method comprising the steps of:

applying each said input signal to a corresponding one of said amplifiers;

operating said amplifiers independently of one another when in said first mode; and operating each said group of amplifiers as a single amplifier when in said second mode;

whereby the signal-to-noise ratio of each said group of amplifiers in said second mode of operation is improved over the signal-to-noise ratio of each said one of said amplifiers when in said first mode of operation.

2. The method of claim 1, wherein the step of operating each said group of amplifiers as a single amplifier further includes the step of:

electrically interconnecting internal nodes of amplifiers within each said group.

3. The method of claim 2, wherein the step of interconnecting internal nodes of amplifiers within each said group comprises connecting gates, sources and drains of transistors in one amplifier in one group with respective gates, sources and drains of corresponding transistors in another amplifier in said one group.

4. The method of claim 1, further including the step of:
   generating the input signals using a corresponding photodiode for each said amplifier.

5. The method of claim 1, wherein the step of operating said amplifiers independently of one another further includes the step of:
   accumulating charge independently at each said amplifier.

6. The method of claim 1, further including the step of:
   outputting a single value signal from each said amplifier when operating in the first mode and outputting a single value signal for each said group of amplifiers when operating in the second mode.

7. The method of claim 6, wherein the step of outputting further includes the step of:
   sequentially outputting each said value signal to a common analog bus.

8. The method of claim 6, further including the step of:
   sampling said value signals in a first time period when in the first mode and sampling said value signals in a second time period when in the second mode, wherein the second time period is shorter than the first time period.

9. A circuit responsive to a control signal, said circuit comprising:
   a plurality of amplifiers each coupled to a corresponding one of a plurality of input signals, the plurality of amplifiers operating independently of one another when in a first mode of operation; and
   a plurality of shorting circuits each coupling together select ones of said plurality of amplifiers to form a plurality of independently operating amplifier groups, and, in response to said control signal, causing each said amplifier group to operate in a second mode of operation as a single amplifier;
   whereby the signal-to-noise ratio of each said amplifier group in said second mode of operation is improved over the signal-to-noise ratio of each said amplifier when in said first mode of operation.

10. The circuit of claim 9, further comprising:
    a plurality of photodiodes each supplying a corresponding one of the plurality of input signals to the plurality of amplifiers.

11. The circuit of claim 9, further including:
    an analog multiplexor coupled to the outputs of said plurality of amplifiers; and
    a common analog bus connected to receive an output signal from said analog multiplexor.

12. The circuit of claim 9, wherein each of the shorting circuits further comprises:
    a plurality of transistors each having
       a control terminal connected to receive the control signal;
       a first data terminal connected to a one amplifier to one of the amplifier groups;
       a second data terminal connected to another amplifier of the same amplifier group.

13. The circuit of claim 9, wherein each of said amplifiers further comprises an input terminal, an output terminal, and a charge integration capacitor connected between the input terminal and the output terminal.

14. The circuit of claim 9 wherein each said amplifier includes a plurality of transistors and wherein said shorting circuits couple gates, sources and drains of select ones of said transistors in one amplifier of an amplifier group with respective gates, sources and drains of corresponding transistors in another amplifier in said amplifier group.

15. A circuit comprising:
    a plurality of amplifying means for receiving corresponding signals and storing charge corresponding to the received signals, each said amplifying means operating independently of one another when in a first mode; and
    means for electrically coupling together select ones of the plurality of amplifier means to form a plurality of amplifier groups and to cause each said amplifier group to operate as a single amplifier when in a second mode.

16. The device of claim 15, further comprising:
    a plurality of photodiodes, each coupled to provide an input signal for a corresponding one of said amplifying means.

17. The device of claim 15, wherein the means for electrically coupling further comprises:
    means for interconnecting internal nodes of at least two of said amplifying means within each group when in the second mode.

18. The device of claim 17, wherein said amplifier means includes transistors and wherein said means for interconnecting effectively combines gate areas of said transistors in one amplifying means with gate areas of said transistors in a corresponding amplifying means in the same amplifier group.

19. The device of claim 15, further comprising
    an analog bus; and
    multiplexing means for receiving the charge stored at said plurality of amplifying means and for selectively forwarding said received charge to said analog bus.

* * * * *